United States Patent
Fanduzzi et al.

(10) Patent No.: US 11,228,262 B2
(45) Date of Patent: Jan. 18, 2022

(54) MOTOR DRIVER CONTROL SYSTEM FOR CONTROLLING MORE THAN ONE MOTOR

(71) Applicant: Eaton Intelligent Power Limited, Dublin (IE)

(72) Inventors: Peter Joseph Fanduzzi, Kenosha, WI (US); Thomas M. Ruchti, Pewaukee, WI (US); Joseph Uphaus, Whitefish Bay, WI (US)

(73) Assignee: Eaton Intelligent Power Limited, Dublin (IE)

( * ) Notice: Subject to any disclaimer, the term of this patent is extended or adjusted under 35 U.S.C. 154(b) by 4 days.

(21) Appl. No.: 16/803,212

(22) Filed: Feb. 27, 2020

(65) Prior Publication Data

US 2020/0336088 A1 Oct. 22, 2020

Related U.S. Application Data

(60) Provisional application No. 62/836,240, filed on Apr. 19, 2019.

(51) Int. Cl.
*H02P 5/46* (2006.01)
*H02P 29/024* (2016.01)

(52) U.S. Cl.
CPC ............ *H02P 5/46* (2013.01); *H02P 29/0241* (2016.02); *H02P 29/0243* (2016.02)

(58) Field of Classification Search
CPC ................................ H02P 5/46; H02P 29/0241
USPC ........................................................ 318/8, 34
See application file for complete search history.

(56) References Cited

U.S. PATENT DOCUMENTS

| | | | | |
|---|---|---|---|---|
| 5,193,189 A | * | 3/1993 | Flood | G05B 19/052 700/11 |
| 7,378,808 B2 | * | 5/2008 | Kuras | H01M 10/482 318/139 |
| 9,667,189 B2 | * | 5/2017 | Li | H02P 29/032 |

OTHER PUBLICATIONS

"140M Motor Protection Circuit Breaker for Multiple Motor Installation with Drives," Rockwell Automation, Inc., Publication 140M-PP004B-EN-P (May 2016).

* cited by examiner

*Primary Examiner* — David Luo
(74) *Attorney, Agent, or Firm* — DiBerardino McGovern IP Group LLC

(57) ABSTRACT

A motor driver control system is configured for connection to a plurality of motors, the motor control system includes a motor driver command module, and the motor driver command module is configured to: access information related to one or more operating metrics of the plurality of motors; analyze the information to determine whether a maintenance condition exists in any of the plurality of motors; and if a maintenance condition exists in any of the plurality of motors: prevent electrical power from reaching any of the plurality of motors, identify which one or more of the plurality of motors has the maintenance condition, disconnect the one or more identified motors from the motor driver control system, and restore electrical power to all of the plurality of motors other than the identified motors after disconnecting the one or more identified motors.

21 Claims, 5 Drawing Sheets

MOTOR DRIVER CONTROL SYSTEM FOR CONTROLLING MORE THAN ONE MOTOR

CROSS-REFERENCE TO RELATED APPLICATION

This application claims the benefit of U.S. Provisional Application No. 62/836,240, filed on Apr. 19, 2019 and titled MOTOR DRIVER CONTROL SYSTEM FOR CONTROLLING MORE THAN ONE MOTOR, which is incorporated herein by reference in its entirety.

TECHNICAL FIELD

This disclosure relates to a motor driver control system.

BACKGROUND

An electric motor converts electrical energy into mechanical energy that is provided to a load. The electric motor may be coupled to a controller or a motor driver control system that governs the operation of the motor.

SUMMARY

In one aspect, a motor driver control system is configured for connection to a plurality of motors, the motor control system includes a motor driver command module, and the motor driver command module is configured to: access information related to one or more operating metrics of the plurality of motors; analyze the information to determine whether a maintenance condition exists in any of the plurality of motors; and if a maintenance condition exists in any of the plurality of motors: prevent electrical power from reaching any of the plurality of motors, identify which one or more of the plurality of motors has the maintenance condition, disconnect the one or more identified motors from the motor driver control system, and restore electrical power to all of the plurality of motors other than the identified motors after disconnecting the one or more identified motors.

Implementations may include one or more of the following features. The maintenance condition may include a failure condition, the failure condition may include an overvoltage, an overcurrent, a short circuit, a thermal overload, and/or a loss of a phase.

The information related to the one or more operating metrics may include the average or peak current collectively drawn by the plurality of motors, a phase of current drawn collectively by the plurality of motors, a voltage applied to the plurality of motors, a waveform that represents current collectively drawn by the plurality of motors over a period of time, and/or a waveform that represents voltage applied to the plurality of motors over a period of time.

The motor driver command module being configured to analyze the information related to the one or more operating metrics may include comparing the information to a specification, and a maintenance condition is determined to exist when the information does not meet the specification. The specification may be a range of values, and the information does not meet the specification when the information includes a value that is not within the range of values. The specification may be a single value, the information may be deemed to not meet the specification when the information includes a value that is greater than or less than the single value, and the information may be deemed to meet the specification when the information includes a value that is equal to the single value.

The motor driver command module being configured to identify which one or more of the plurality of motors has a maintenance condition may include the motor driver command module being configured to: provide electrical power to only one of the plurality of motors at any given time during a testing cycle time period to produce test information related to the one or more operating metrics for the one of the plurality of motors, determine whether the maintenance condition exists in the one of the motors based on the test information, and if the maintenance condition exists, identify the one of the motors as a motor with a maintenance condition.

The motor driver control system also may include a plurality of protection modules, and each protection module may include a motor overload device and a switching relay, and the switching relay may have a current interruption rating that is lower than the continuous current rating of the particular one of the plurality of motors. In these implementations, the motor driver command module being configured to prevent electrical power from reaching any of the plurality of motors includes the motor driver command module being configured to break a current supply to the plurality of motors in response to determining that the maintenance condition exists in any of the plurality of motors, the motor driver command module is further configured to control a state of the switching relay, and the motor driver command module being configured to disconnect the one or more identified motors includes the motor driver command module being configured to change a state of the switching relay in each protection module that is connected to one of the one or more identified motors. The motor overload device may include a motor overload relay. The motor overload relay may include a normally open relay and a normally closed relay. The motor overload relay may include an electronic overload relay.

The motor driver control system also may include a plurality of protection modules, and each protection module may include an overload relay and contactor that has a current interruption rating equal to or greater than the continuous current rating of the particular one of the plurality of motors. The motor driver command module may be further configured to control a state of the contactor, and the motor drive control module being configured to disconnect the one or more identified motors may include the motor driver command module being configured to change a state of the contactor in each protection module that is connected to one of the one or more identified motors.

The motor driver command module may be further configured to analyze the information to determine a measure of wellness for the plurality of motors, the measure of wellness being an indication of an amount of time or an amount of use remaining prior to a maintenance condition occurring. The motor driver command module may be further configured to determine the measure of wellness for each of the plurality of motors. Each of the plurality of motors may include an element configured to spin, and the motor driver command module is further configured to estimate a speed at which the element of at least one motor not identified as having the maintenance condition is spinning. The motor driver command module is configured to restore electrical power after disconnecting the one or more identified motors and while at least one motor not identified as having the maintenance condition is spinning, and the motor driver command module is further configured to generate a driver signal that, when applied to the at least one motor not identified as having the maintenance condition, the at least one motor not identified as having the maintenance condition continues to operate at the estimated speed.

In some implementations, each of the plurality of motors includes an element configured to spin, and the motor driver command module is configured to restore electrical power after disconnecting the one or more identified motors and only after any motor not identified as having the maintenance condition is not spinning.

In another general aspect, a method of protecting a plurality of motors connected to a motor driver control system includes allowing electrical power to reach all of the plurality of motors, the electrical power being sufficient to cause the motors to operate; receiving information related to one or more operating metrics of the plurality of motors; analyzing the received information to determine whether one or more of the plurality of motors has a maintenance condition; if at least one of the motors has a maintenance condition: preventing the electrical power from reaching any of the plurality of motors such that none of the motors operate, identifying which one or more of the plurality of motors has the maintenance condition, and disconnecting the one or more identified motors from the motor driver control system, and allowing electrical power to flow to the plurality of motors other than the one or more identified motors after disconnecting the one or more identified motors.

In some implementations, identifying which one or more of the plurality of motors has the maintenance condition includes testing each motor separately in a testing cycle. The testing for each motor may include providing electrical power to one of the plurality of motors at a given time during the testing cycle to produce test information related to the one or more operating metrics of the one of the plurality of motors; and analyzing the test information to determine whether the one of the plurality of motors has the maintenance condition.

Implementations of any of the techniques described herein may include a system, an apparatus, and/or a method. The details of one or more implementations are set forth in the accompanying drawings and the description below. Other features will be apparent from the description and drawings, and from the claims.

DRAWING DESCRIPTION

DETAILED DESCRIPTION

Figure 1:
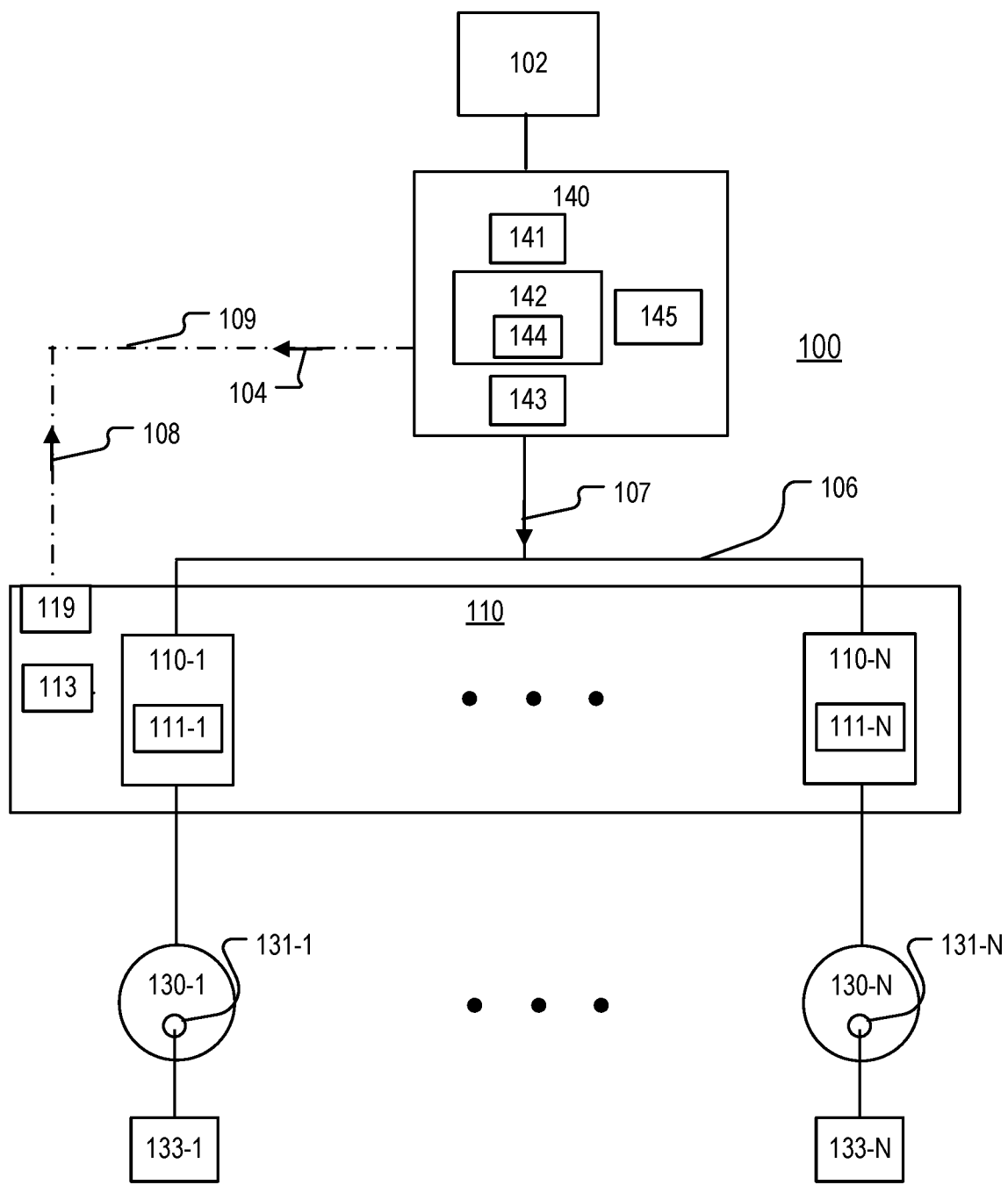
FIG. 1 is a block diagram of an example of a system that includes a motor driver control system and a protection apparatus.

FIG. 1 is a block diagram of a system 100 that includes a motor driver control system 140 and a protection apparatus 110. The protection apparatus 110 includes a plurality of protection modules 110-1 to 110-N, where N is an integer number that is greater than or equal to two. Each protection module 110-1 to 110-N is electrically connected to a bus 106 and is configured to control whether or not a respective alternating current (AC) motor 130-1 to 130-N is electrically connected to the bus 106. The motor driver control system 140 includes a motor driver command module 144 that is configured to determine whether a maintenance condition exists in any the motors 130-1 to 130-N based on data 108. The data 108 includes information related to one or more operating metrics of the motors 130-1 to 130-N. If a maintenance condition exists in any of the motors 130-1 to 130-N, the motor driver command module 144 identifies which of the motors 130-1 to 130-N has a maintenance condition.

A maintenance condition may be a condition that causes the motor to operate in a non-optimal or unexpected manner or a condition that causes the motor to be inoperable. A maintenance condition may be, for example, an overvoltage condition in which a voltage that exceeds a rated voltage is applied to the motor, an overcurrent condition in which the motor draws more than a rated amount of electrical current, a short circuit condition, a thermal overload condition in which a temperature of the motor exceeds a rated temperature, and/or a loss of one or more phases. Moreover, the motor driver command module 144 also may determine a measure of wellness of the motors 130-1 to 130-N based on the data 108. The measure of wellness may be, for example, an indication of how soon the motor may begin to degrade and/or become inoperable.

The motor driver control system 140 disconnects the motor or motors that are identified as having a maintenance condition so that motors that have a maintenance condition may be serviced or replaced. Motors that do not have a maintenance condition remain connected to the motor driver control system 140 such that these motors continue to receive the motor driver signal 107 and continue to drive their respective load. Thus, the motor driver control system 140 reduces downtime and reduces service interruptions. Moreover, because the motor driver command module 144 is capable of determining a measure of wellness, the motor driver control system 140 may disconnect the motor or motors identified as having degraded performance so that the motors may be serviced prior to failure and with minimal disruption to the other motors and the end user.

Each protection module 110-1 to 110-N includes a respective switching network 111-1 to 111-N. Each switching network 111-1 to 111-N determines whether a respective one of the motors 130-1 to 130-N is electrically connected to the motor driver control system 140. Each switching network 111-1 to 111-N has at least two states, including a state that allows electrical current to flow and a state that prevents electrical current from flowing. The switching networks 111-1 to 111_N may include components that are not rated to interrupt the driver signal 107 (such as discussed with the example of FIG. 4) or components that are able to interrupt the driver signal 107 (such as discussed with the example of FIG. 5).

The protection apparatus 110 and the motor driver control system 140 exchange information, signals, and/or commands over a control path 109 (shown with a dash-dot line style). The control path 109 is between an input/output (I/O) interface at the motor driver control system 140 and an input/output (I/O) 119 at the protection apparatus. The control path 109 may include any type of wired or wireless medium that is capable of transmitting or carrying data, including, for example, information and/or commands. For example, the control path 109 may include electrical cables and/or optical fiber cables. In implementations in which the control path 109 is a wireless control path, the I/O interface 143 and the I/O 119 may include transceivers that send and receive data via the control path 109. The control path 109 is bi-directional such that data 108 is transmitted from the protection apparatus 110 to the motor driver control system 140, or may be retrieved from the protection apparatus 110, and control signals 104 are transmitted from the motor driver control system 140 to the protection apparatus 110.

The protection module 110 also includes a sensing system 113. The sensing system 113 includes a sensor, such as, for example, a current sensor and/or a voltage sensor. The sensing system 113 produces the data 108. The sensing system 113 may include more than one sensor. The sensing system 113 may include, for example, a sensor configured to sense one or more properties (such as amplitude, frequency, and/or phase) of electrical current drawn by the motors 130-1 to 130-N and/or voltage applied to the motors 130-1 and 130-N. An operating metric is any measurable quantity related to the operation of the motors 130-1 to 130-N. For example, the operating metric may be a voltage applied to the motors 130-1 to 130-N or a total current drawn by the motors 130-1 to 130-N. The operating metric also may be a value that indicates a condition or status of the motors 130-1 to 130-N, such as a value that indicates whether the elements 131-1 to 131-N are moving.

The sensing system 113 is coupled to the motor driver control system 140 such that the motor driver command module 144 is able to access the data 108. In the implementation of FIG. 1, the sensing system 113 is coupled to the motor driver command module 144 by the control path 109 via the I/O 119. Other implementations are possible. For example, the sensing system 113 may be connected to the motor driver control system 140 via a separate control path (not shown).

In the implementation of FIG. 1, the sensing system 113 is configured to measure an operating metric of all of the motors 130-1 to 130-N that are electrically connected to the motor driver control system 140. For example, the sensing system 113 may measure the total current is drawn by the motors 130-1 to 130-N and/or the total voltage applied to all of the motors 130-1 to 130-N.

Other implementations of the sensing system 113 are possible. For example, in some implementations, each protection module 110-1 to 110-N includes a respective sensing module that measures an operating metric of the respective motor 130-1 to 130-N. An example of such an implementation is shown with the sensing modules 413-1 to 413-N of FIG. 4. In some implementations, the sensing system 113 is separate from the protection apparatus 110. For example, the sensing system 113 may be implemented as part of the motor driver control system 140. In these implementations, the sensing system 113 may be, for example, a current sensor that measures the amount of current that is drawn by the protection module 110. In another example, the sensing system 113 is separate from the protection apparatus 110 and the motor driver control system 140. For example, the sensing system 113 may be between the protection apparatus 110 and the motor driver control system 140 and configured to measure the electrical current that is drawn by the bus 106. In implementations in which the sensing system 113 is separate from the protection apparatus 110, the sensing system 113 and the motor driver control system 140 exchange data via a control path that is separate from the control path 109.

The motor driver control system 140 may be a variable frequency drive (also referred to as an adjustable frequency drive or a variable speed drive). The motor driver control system 140 receives alternating current (AC) power from a power source 102 and provides a driver signal 107 to the bus 106. The power source 102 may be, for example, an electrical power distribution network or an electrical power grid that distributes three-phase electrical power having a fundamental frequency of 60 Hertz (Hz). The driver signal 107 may be, for example, an AC voltage signal that has an amplitude that is sufficient to operate the motors 130-1 to 130-N. The motor driver control system 140 controls the torque and speed of the motors 130-1 to 130-N by varying a frequency and/or voltage of the driver signal 107.

Each of the motors 130-1 to 130-N includes a respective movable element 131-1 to 131-N. For example, the movable elements 131-1 to 131-N may be rotors that rotate relative to a stator in response to application of the driver signal 107 to convert the electrical energy in the driver signal 107 into mechanical energy that drives a respective load 133-1 to 133-N. Each load 133-1 to 133-N may be, for example, a fan or a pump.

The motor driver control system 140 includes an electronic processing module 141, an electronic storage 142, and the input/output (I/O) interface 143. The electronic processing module 141 includes one or more electronic processors. The electronic processors of the electronic processing module 141 may be any type of electronic processor and may or may not include a general purpose central processing unit (CPU), a graphics processing unit (GPU), a microcontroller, a field-programmable gate array (FPGA), Complex Programmable Logic Device (CPLD), and/or an application-specific integrated circuit (ASIC).

The electronic storage 142 may be any type of electronic memory that is capable of storing data and instructions in the form of computer programs or software, and the electronic storage 142 may include volatile and/or non-volatile components. The electronic storage 142 and the electronic processing module 141 are coupled such that the electronic processing module 141 is able to access or read data from and write data to the electronic storage 142. The electronic storage 142 stores instructions or logic, for example, in the form of a computer program, function, or procedure that govern the operations of the motor driver control system 140 and the interaction between the motor driver control system 140 and the protection apparatus 110.

In the example, of FIG. 1, the motor driver command module 144 is implemented as a software module that is stored on the electronic storage 142. For example, the motor driver command module 144 may be a collection of instructions or a computer program that is executed by the electronic processing module 141. The motor driver command module 144 includes instructions and/or logic for processing and/or analyzing the data 108 and also may include instructions for controlling the protection apparatus 110 and each of the protection modules 110-1 to 110-N.

The electronic storage 142 also may store information related to the motors 130-1 to 130-N. For example, the electronic storage 142 may store a specification for each of the motors 130-1 to 130-N. The specification includes information related to the expected, typical, safe, and/or optimal operation of the motors 130-1 to 130-N. The specification may include particular values and/or ranges of values. For example, the continuous current rating for each of the motors 130-1 to 130-N may be stored on the electronic storage 142 as a specification. The specification may include a range of values. For example, a range of values that represent an range voltages that may be applied to each of the motors 130-1 to 130-N or a range of currents that may be drawn by each of the motors 130-1 to 130-N may be stored on the electronic storage 142 as a specification.

Although the specification relates to expected operation of the motors 130-1 to 130-N, the specification may include information that indicates the presence of a potential malfunction or degradation in performance. For example, the specification may include a current value that is known to indicate that a short circuit is present within any of the motors 130-1 to 130-N. In some implementations, the motors 130-1 to 130-N are identical except for typical manufacturing variations that occur when the motors 130-1 to 130-N are assembled. In these implementations, the specification may include a value or a range of values that applies to all of the motors 130-1 to 130-N.

The I/O interface 143 is any interface that allows a human operator, another machine, and/or an autonomous process to interact with the motor driver control system 140. The motor driver control system 140 communicates with the protection apparatus 110 through the I/O interface 143. For example, the control path 109 is electrically coupled to the I/O interface 143 such that the I/O interface 143 receives the data 108 from the protection apparatus 110 by retrieving or receiving the data 108 from the protection apparatus 110.

The I/O interface 143 may include, for example, a display (such as a liquid crystal display (LCD)), a keyboard, a control pad, audio input and/or output (such as speakers and/or a microphone), visual output (such as lights, light emitting diodes (LED)) that are in addition to or instead of the display, serial or parallel port, a Universal Serial Bus (USB) connection, any type of electrical connection interface, and/or any type of network interface, such as, for example, Ethernet. The I/O interface 143 also may allow communication without physical contact through, for example, an IEEE 802.11, Bluetooth, or a near-field communication (NFC) connection. The motor driver control system 140 may be, for example, operated, configured, modified, or updated through the I/O interface 143. In some implementations, instructions and/or logic stored on the electronic storage 142 may be revised or updated, and/or additional instructions and/or logic may be added to the electronic storage 142 through the I/O interface 143. In other words, in some implementations, the motor driver command module 144 may be programmed through the I/O interface 143.

The I/O interface 143 also may allow the motor driver control system 140 to communicate with systems external to and remote from the motor driver control system 140. For example, the I/O interface 143 may include a communications interface that allows communication between the motor driver control system 140 and a remote station (not shown), or between the motor driver control system 140 and a separate computing system. The remote station or separate computing system may be any type of station through which an operator is able to communicate with the motor driver control system 140. For example, the remote station or the separate computing system may be a computer-based work station, a smart phone, tablet, or a laptop computer that connects to the motor driver control system 140 via a services protocol, a remote control that connects to the motor driver control system 140 via a radio-frequency signal, and/or an industrial device that connects to the motor driver control system 140 via the SCADA protocol or an automation protocol (such as, for example, Fieldbus or Modbus).

The motor driver control system 140 also includes an electrical network 145. The electrical network 145 includes electronic components. The electronic components may include passive components such as, for example, diodes, transistors, resistors, inductors, and/or capacitors. The electronic components also may include active components, such as DC power supplies, that are used with the passive components. The electrical network 145 is configured to produce the driver signal 107 based on the electrical power from the source 102. For example, the electrical network 145 may include a rectifier that converts the three-phase AC electrical power from the source 102 into a three-phase direct-current (DC) electrical signal. The rectifier may include a network of diodes. The electrical network 145 also may include a DC link or bus that stores the DC electrical signal. The electrical network 145 also may include a network of power transistors and/or other components arranged to form an inverter that coverts the DC electrical signal into an AC signal having a specific voltage amplitude and frequency to thereby generate the driver signal 107. The inverter is controllable such that the driver signal 107 is an voltage signal with characteristics that allow the motors 130-1 to 130-N to be driven at a speed and torque required by the loads 133-1 to 133-N.

Figure 2:
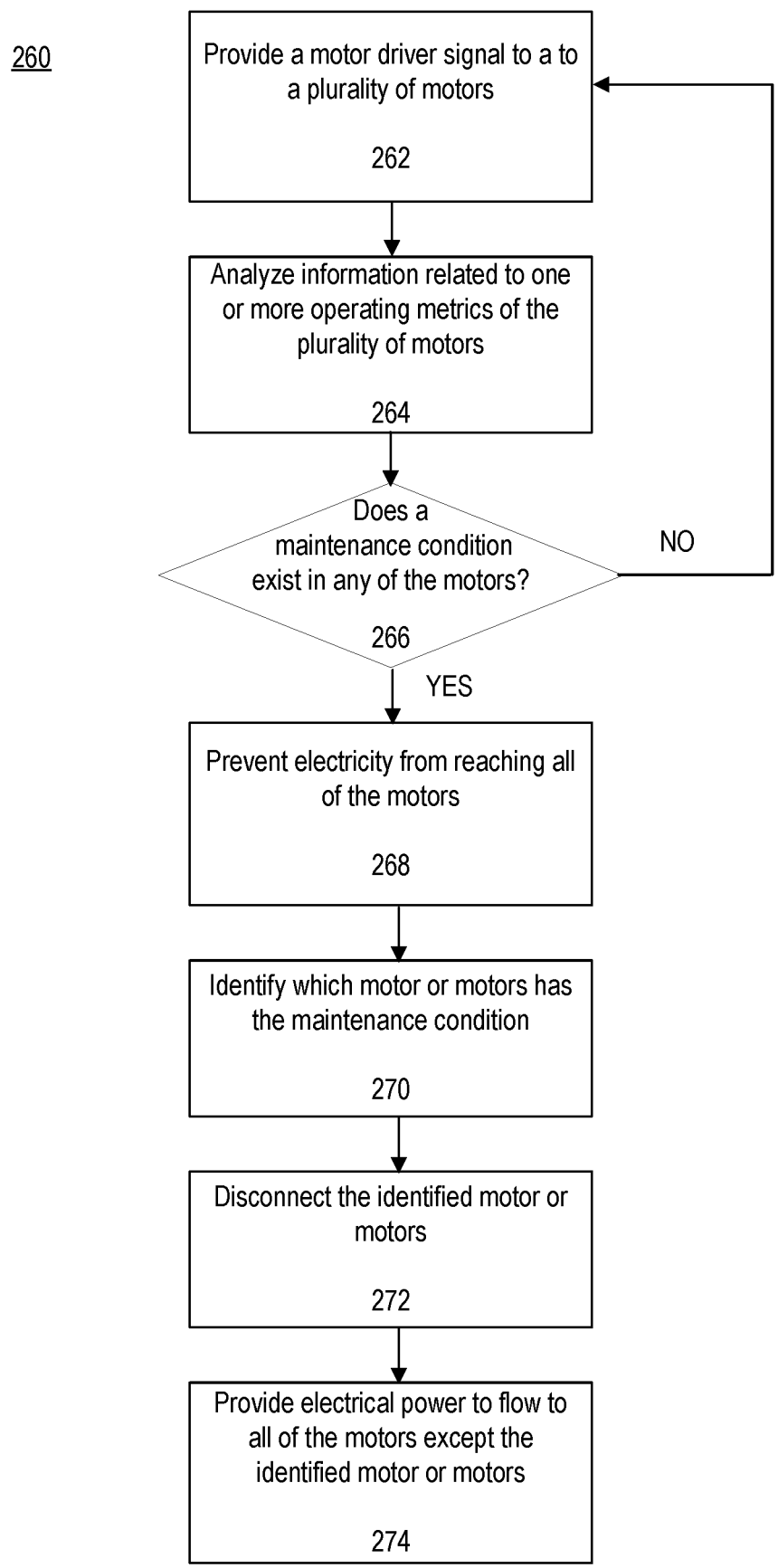
FIG. 2 is a flow chart of an example of a process for protecting a plurality of motors.

FIG. 2 is a flow chart of an example process 260 for protecting the motors 130-1 to 130-N. The process 260 is performed by the motor driver command module 144 and one or more electronic processors in the electronic processing module 141. The process 260 is discussed with respect to the protection apparatus 110 (FIG. 1). However, the motor driver control system 140 may be coupled to other protection modules, and the motor process 260 may be performed while the motor driver control system 140 is coupled to other protection modules.

The motor driver signal 107 is provided to the motors 130-1 to 130-N (262). The motor driver control system 140 generates the motor driver signal 107 based on AC electrical power received from the source 102. The AC electrical power received from the source may include more than one phase and may be a three-phase AC electrical power signal that has a fundamental frequency of 60 Hz. The motor driver control system 140 motor driver signal 107 may be, for example, a voltage signal that has an amplitude, frequency, and phase that is determined by controlling the electrical network 145.

The motor driver control system 140 provides the motor driver signal 107 to the bus 106. Under ordinary operating conditions, all of the protection modules 110-1 to 110-N are in a state in which current is able to flow to the motors 130-1 to 130-N and the motor driver signal 107 powers the motors 130-1 to 130-N.

The motor driver command module 144 accesses the data 108. In some implementations, the motor driver command module 144 accesses the data 108 by receiving the data 108 from the protection apparatus 110. For example, the sensing system 113 may periodically measure the amount of current drawn by the motors 130-1 to 130-N to produce the data 108, and the sensing system 113 may push the data 108 to the motor driver command module 114 each time the amount of current is measured. In other implementations, the sensing system 113 includes an electronic storage that accumulates the data 108 over time. In these implementations, the motor driver command module 114 may retrieve the data 108 from the electronic storage of the sensing system 113 and/or the sensing system 113 may push the data 108 to the motor driver command module 144 at regular intervals. The data 108 includes information related to one or more operating metrics of the motors 130-1 to 130-N.

The motor driver command module 144 analyzes the data 108 (264). The motor driver command module 144 may analyze the data 108 by comparing the data 108 to a specification stored on the electronic storage 142. The specification indicates values of the operating metrics that are associated with optimal, acceptable, and/or safe operation of the motors 130-1 to 130-N. For example, the specification may include a maximum current that may be collectively drawn by the motors 130-1 to 130-N or a current that indicates that one or more of the motors 130-1 to 130-N are experiencing a short circuit condition. The specification also may include one or more ranges of values. For example, the specification may include a range of voltages that may be safely applied to the motors 130-1 to 130-N. To compare the data 108 to the specification, the motor driver command module 144 may, for example, determine a difference between a value in the specification and compare the difference to a pre-defined threshold. In another example, the motor driver command module 144 may determine whether a value in the data is within a range of values (for example a range of acceptable voltages) that are part of the specification.

The motor driver command module 144 may analyze the data 108 in other ways. For example, the motor driver command module 144 may determine a measure of wellness for the motors 130-1 to 130-N. For example, the motor driver command module 144 may compare the data 108 to an instance of the data 108 that was received at an earlier time. In these implementations, the motor driver command module 144 determines changes to a particular operating metric over time to determine whether or not the performance of the motors 130-1 to 130-N is beginning to degrade. In another example, the motor driver command module 144 may compare the actual operating time of the motors 130-1 to 130-N to the expected lifetime (measured in a unit of time) to predict the expected remaining lifetime of the motors 130-1 to 130-N. The measure of wellness may be based on more than one measurable quantity related to the motors 130-1 to 130-N. For example, the measure of wellness may be based on a total amount of current drawn by the motors 130-1 to 130-N and an expected lifetime (expressed in units of operating time) to account for situations in which the motors 130-1 to 130-N are subject to unusually heavy or unusually light use.

The motor driver command module 144 determines whether or not a maintenance condition exists in any of the motors 130-1 to 130-N (266). The motor driver command module 144 determines that a maintenance condition does not exist if the operating metric or metrics 130-1 to 130-N are within specification and/or do not show signs of degraded performance. If a maintenance condition does not exist, then the process 260 returns to (262) and the motor driver signal 107 continues to be provided to the motors 130-1 to 130-N and (262)-(266) continue to be performed to provide protection to the motors 130-1 to 130-N.

The motor driver command module 144 determines that a maintenance condition exists when the data 108 indicates that the operating metric or metrics of the motors 130-1 to 130-N are not within the specification or are in the process of degrading. If the motor driver command module 144 determines that a maintenance condition exists, the motor driver command module 144 prevents electricity from reaching any of the motors 130-1 to 130-N (268). Thus, when a maintenance condition exists, none of the motors 130-1 to 130-N receive the motor driver signal 107 and none of the motors 130-1 to 130-N are powered.

The motor driver command module 144 may prevent electricity from reaching the motors 130-1 to 130-N by causing the motor driver control system 140 to interrupt the current to the motors 130-1 to 130-N. In these implementations, the motor driver command module 144 issues a command to the electrical network 145 that causes the motor driver control system 140 to interrupt the electrical path between the source 102 and the bus 106. For example, the motor driver command module 144 may cause a switch (such as a power transistor or other interrupting mechanism) to open such that the electrical path between the source 102 and the bus 106 is opened and the driver signal 107 is no longer provided to the bus 106 (or the motors 130-1 to 130-N). In these implementations, the motor driver control system 140 is relied upon to provide current interruption and the components of the switching networks 111-1 to 111-N may have an interruption rating that is less than maximum continuous current rating of their respective motor 130-1 to 130-N. An example of such an implementation is discussed with respect to FIG. 4.

In other implementations, each switching network 111-1 to 111-N includes a controllable contactor that has a current interruption rating that is equal to or greater than the continuous current rating of the respective motor 130-1 to 130-N. In these implementations, the motor driver command module 144 prevents electricity from reaching the motors 130-1 to 130-N by changing the state of the switching network 111-1 to 111-N. An example of such an implementation is discussed with respect to FIG. 5. In these implementations, the motor driver command module 144 may prevent electrical power from reaching any of the motors 130-1 to 130-N by controlling a component within the electrical network 145 such that the electrical path between the source 102 and the bus 106 is opened or by changing the state of all of the switching networks 111-1 to 111-N simultaneously.

After the electrical power to the motors 130-1 to 130-N is interrupted, the motor or motors of the motors 130-1 to 130-N that have a maintenance condition are identified (270). Any number of the motors 130-1 to 130-N may have a maintenance condition. For example, one of the motors 130-1 to 130-N may have a maintenance condition, more than one of the motors 130-1 to 130-N may have a maintenance condition, or all of the motors 130-1 to 130-N may have a maintenance condition. Moreover, different motors 130-1 to 130-N may have different types of maintenance conditions.

Figure 3:
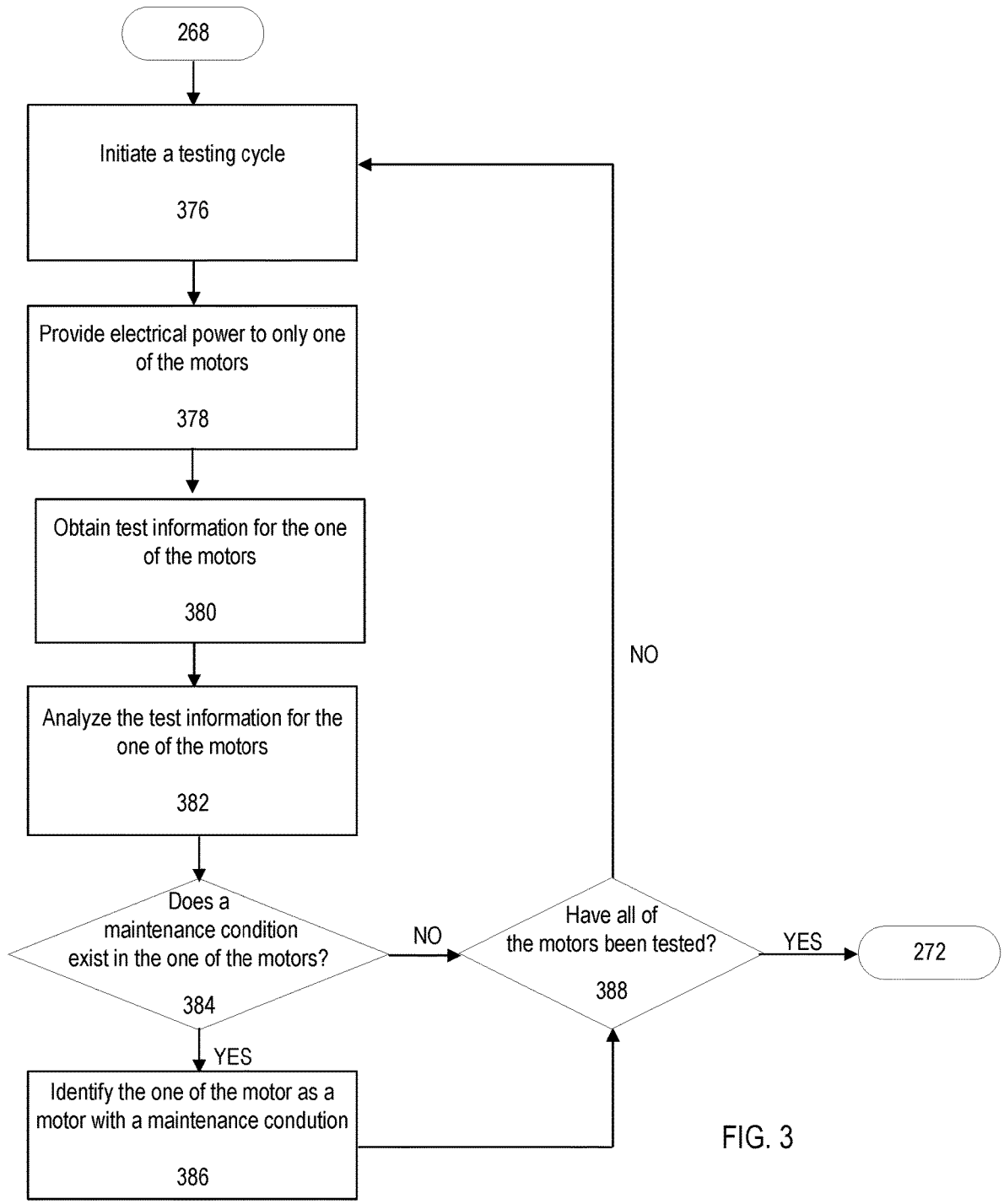
FIG. 3 is a flow chart of an example of a process for identifying a motor or motors that have a maintenance condition.

Referring also to FIG. 3, a flow chart of an example implementation of a process 370 for identifying the motor or motors that have a maintenance condition is shown. The process 370 is performed by the motor driver command module 144 and may be performed as part of the process 260. For example, the process 370 may be used as the step (270) of the process 260.

A testing cycle is initiated (376). For example, the motor driver command module 144 may initiate the testing cycle by calling a function or software module that is implemented a collection of instructions or a computer program stored on the electronic storage 142.

Electrical power is provided to only one of the motors 130-1 to 130-N (378). For example, in implementations in which the switching networks 113-1 to 113-N include components that are not rated to interrupt the current to the respective motors, the motor driver command module 144 controls the motor driver control system 140 such that the motor driver signal 107 is temporarily not provided or is interrupted. The motor driver command module 144 then controls the state of one of the switching networks 113-1 to 113-N such that one of the motors 130-1 to 130-N is electrically connected to the bus 106. The one of the motors 130-1 to 130-N that is electrically connected to the bus 106 is referred to as the connected motor. The motor driver command module 144 then issues a command to the electrical network 145 such that the motor driver control system 140 generates the driver signal 107 and electrical power is provided to the connected motor.

In implementations in which the switching networks 113-1 to 113-N include components that are rated to interrupt the current to the respective motors, the motor driver command module 114 provides control signal 104 to one of the switching networks 113-1 to 113-N while the motor driver control system 140 generates the driver signal 107. The control signal 104 is sufficient to change the state of that one switching network such that the driver signal 107 is provided only to one of the motors 130-1 to 130-N.

Test information for the one of the motors 130-1 to 130-N is obtained (380). For example, the sensor system 113 may monitor the current drawn by and/or the voltage applied to the one of the motors 130-1 to 130-N that is electrically connected to the bus 106 and provides the measured data to the motor driver command module 144. Because only one of the motors 130-1 to 130-N is electrically connected to the bus 106 and is able to receive the motor driver signal 107, the information obtained by the sensor system 113 is related to only one of the motors 130-1 to 130-N. In this way, the operating metric or metrics of a single one of the motors 130-1 to 130-N is analyzed. The data from the connected one of the motors 130-1 to 130-N may be analyzed by, for example, comparing the data to the specification for that motor.

The motor driver command module 144 determines whether or not a maintenance condition exists in the connected one of the motors 130-1 to 130-N (384). A maintenance condition exists, for example, when the data related to the operating metric or metrics exceeds a value stored in the specification or is outside of a range of values stored in the specification. If the data measured by the sensor system 113 indicates that the connected one of the motors 130-1 to 130-N is performing according to the specification, then a maintenance condition does not exist.

If a maintenance condition exists, then the motor driver command module 144 identifies the connected one of the motors 130-1 to 130-N as being a motor with a maintenance condition (386). The motor may be identified, for example, by setting a flag or a binary value in association with the one of the motors 130-1 to 130-N in a table that is stored on the electronic storage 142.

If a maintenance condition does not exist in the connected one of the motors 130-1 to 130-N, a different flag or different binary value may be stored in association with that motor in the table that is stored on the electronic storage 142 to indicate that the connected one of the motors 130-1 to 130-N does not have a maintenance condition. The motor driver command module 144 determines whether or not all of the motors 130-1 to 130-N have been tested for a maintenance condition (388). If all of the motors 130-1 to 130-N have not been tested, the testing cycle continues, and the process 370 returns to 376. If all of the motors 130-1 to 130-N have been tested, the testing cycle ends and the process 260 resumes.

Referring again to FIG. 2, the identified motor or motors identified as having a maintenance condition are disconnected from the motor driver control system 140 (272). For example, the motor driver command module 144 may access the table stored on the electronic storage 142 to determine which motor or motors of all of the motors 130-1 to 130-N should be disconnected. The motor driver command module 144 controls the switching networks 111-1 to 111-N based on whether or not the respective motor 130-1 to 130-N has been identified as having a maintenance condition.

For example, if only the motor 130-1 has been identified as having a maintenance condition, the motor driver command module 144 issues a command via the control path 109 that causes the switching network 111-1 to be in a state in which current is unable to flow such that the motor 130-1 is not electrically connected to the bus 106. The motor driver command module 144 also issues a control signal 104 to ensure that all of the other switching networks are in a state that allows electricity to flow. Thus, all of the motors are connected to the bus 106 except for the motor with the maintenance condition (the motor 130-1 in this example).

Electrical power is allowed to flow to all of the motors 130-1 to 130-N except for the identified motor or motors (274). For example, the motor driver signal 107 is generated and provided to the bus 106 after the identified motor or motors have been disconnected (272) such that the motor driver signal 107 powers all of the motors 130-1 to 130-N except for the identified motor or motors. For example, the motor driver command module 144 may interact with the electrical network 145 such that the motor driver signal 107 is restored after a period that of not being generated. In implementations in which the protection module 110 includes components that are capable of interrupting the current to the to the motors 130-1 to 130-N, the motor driver signal 107 may be generated throughout the testing cycle and is thus restored to a particular one of the motors when the switching network is in a state that electrically connects that particular motor to the bus 106.

The movable elements 131-1 to 131-N may continue to rotate for a finite amount of time after being disconnected from a power supply. Thus, the moveable elements 131-1 to 131-N may continue to rotate even when not electrically connected to the bus 106 and/or even while the motor control system 140 is not providing the driver signal 107. In some implementations, the driver signal 107 is restored while some or all of the movable elements 131-1 to 131-N are rotating. In these implementations, the motor driver control system 140 and/or the motor driver command module 144 may estimate the speed of the movable elements 131-1 to 131-N and may adjust the driver signal 107 such that the movable elements 131-1 to 131-N are initially driven at their current speed. In these implementations, the end user may perceive less of a service interruption because some or all of the motors 130-1 to 130-N continue to provide power to their respective loads during the testing cycle.

Other implementations of the process 260 and/or the process 370 are possible. For example, the testing cycle discussed with respect to the process 370 continues until all of the motors 130-1 to 130-N are tested for a maintenance condition. However, in some implementations, fewer than all of the motors 130-1 to 130-N are tested during a testing cycle. For example, an operator of the motor driver control system 140 may specify that a subset (fewer than all) of the motors 130-1 to 130-N be tested during the testing cycle. Thus, at (388), all of the motors may be all of a subset of the motors 130-1 to 130-N.

Figure 4:
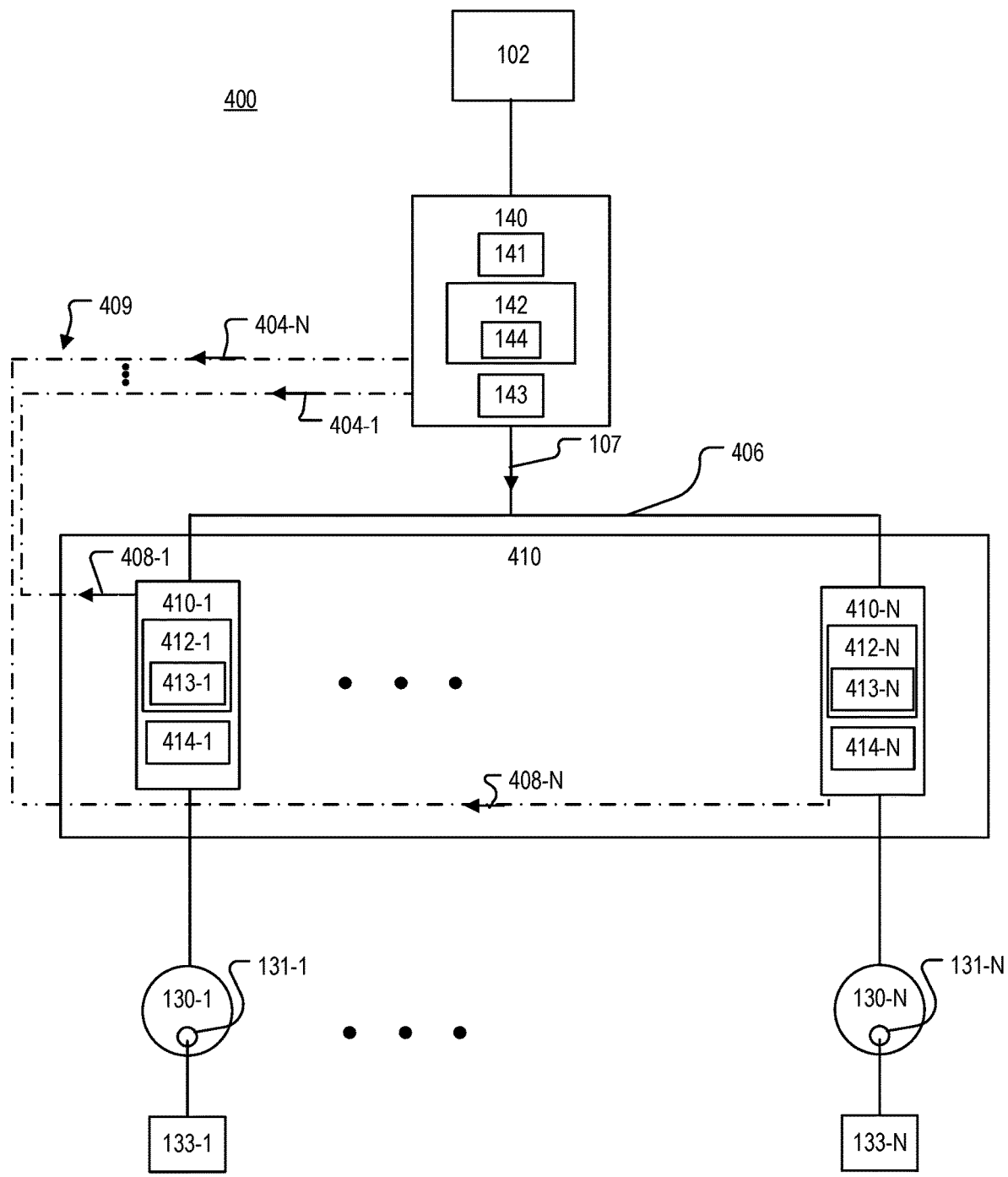
FIGS. 4 and 5 are block diagrams of other example systems that include a motor driver control system and a protection apparatus.
Figure 5:
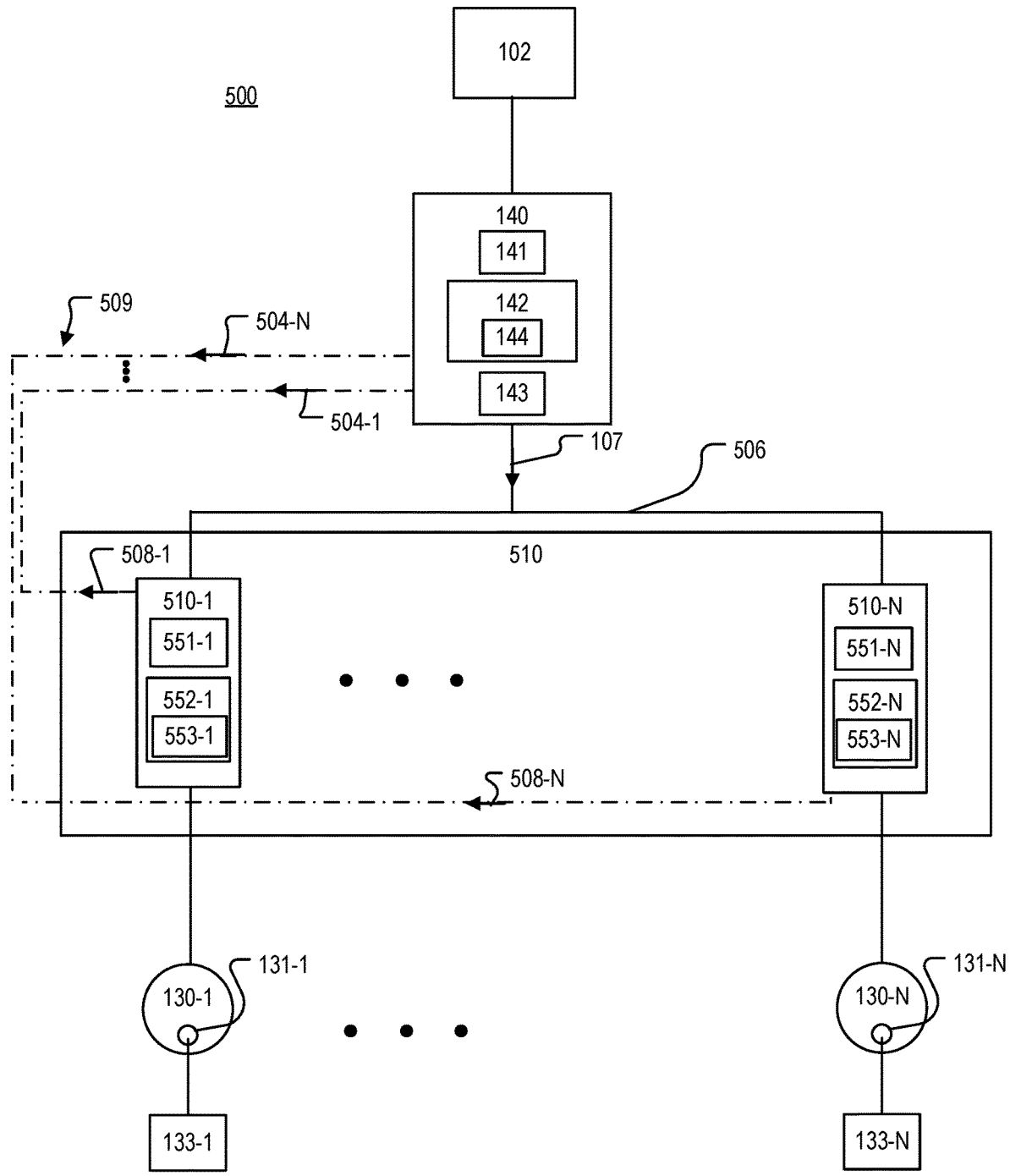

FIGS. 4 and 5 show examples of respective protection apparatuses 410, 510 that may be coupled to the motor driver control system 140. The processes 260 and 370 may be performed while the motor driver control system 140 is in communication with the protection apparatus 410 or the protection apparatus 510.

FIG. 4 is a block diagram of a system 400 that includes the motor driver control system 140 and the protection apparatus 410. The protection apparatus 410 is an example of an implementation of the protection apparatus 110 (FIG. 1). The protection apparatus 410 includes protection modules 410-1 to 410-N. The protection apparatus 410 and the motor driver control system 140 communicate via a control path 409 (shown with a dash-dot line style). The control path 409 is any type of communication path that allows the protection apparatus 410 and the motor driver control system 110 to exchange information, commands, and/or data. The control path 409 may be a wired connection or a wireless connection, and the information, commands, and data may be digital or analog. The protection apparatus 410 may communicate with the motor driver control system 140 using a communications protocol. A communications protocol uses a series of bits to communicate status to the motor driver control system 140. The protection apparatus 410 and the motor driver control system 140 may leverage microcontrollers or similar devices to facilitate passage of the status. For example, the protection apparatus 410 may include an I/O (such as the I/O 119 of FIG. 1) that includes a microcontroller. In some implementations, the status may be passed from the protection apparatus 410 to the motor driver control system 140 via an input/output on the protection apparatus 410. For example, the status of the protection apparatus 410 and/or the status of the protection modules 410-1 to 410-N may be provided over a physical wire connected between the I/O on the protection apparatus 410 and the I/O interface 143. The output terminal on the protection apparatus 410, may be, for example, a pin connection, an electrical connection on a terminal block. In the example of FIG. 4, the control path 409 is a multi-wire cable that has at least N electrical cables, with one of the N cables being associated with one of the protection modules 410-1 to 410-N. Each of the N electrical cables is capable of transmitting electrical signals.

Each protection module 410-1 to 410-N is electrically connected to a bus 406 and is associated with a respective one of the motors 130-1 to 130-N. Each protection module 401-1 to 410-N includes the same components in the same configuration and functions in a similar manner. For simplicity, only the protection module 401-1 is discussed in detail. However, the description of the protection module 401-1 applies to the other protection modules in the protection apparatus 410.

The protection module 410-1 includes a motor overload device 412-1 in series with a switching relay 414-1. The motor overload device 412-1 is an electronic overload topology that may or may not include a normally open or a normally closed relay. The motor overload device 412-1 includes a sensing module 413-1 that monitors at least one operating metric of the motor 430-1. The sensing module 413-1 includes a sensor, such as, for example, a current sensor and/or a voltage sensor. The sensing module 413-1 may include, for example, a sensor configured to sense one or more properties (such as amplitude, frequency, and/or phase) of electrical current drawn by the motor 430-1 and/or voltage applied to the motor 430-1. The sensing module 413-1 may include more than one sensor.

The operating metric is any measurable quantity related to the operation of the motor 430-1. For example, the operating metric may be a voltage applied to the motor 430-1 or a current drawn by the motor 430-1. The operating metric also may be a value that indicates a condition or status of the motor 430-1, such as a value that indicates whether the element 431-1 is moving.

The sensing module 413-1 also may include associated electronic elements that are used with the sensor. For example, the sensing module 413-1 may include an electronic processor, an electronic storage, and/or an interface for receiving electrical power to power the sensor and associated electronic elements. In some implementations, the sensing module 413-1 includes an electronic storage that stores threshold current and/or voltage levels. When the sensor measures a current and/or a voltage that exceeds the threshold current and/or voltage, the data 408-1 produced by the sensing module 413-1 is a flag or binary value that only indicates that the threshold has been exceeded. In another example, the electronic storage may store the unique identifier and/or instructions for processing the sensed properties, and electronic processor may be used to generate the indication based on the sensed properties according to the stored instructions. The sensing module 413-1 produces an indication of the sensed property or properties and provides the indication to the motor driver control system 140 as data 408-1.

The protection module 410-1 also includes a switching relay 414-1. The switching relay 414-1 includes one or more electronic components that are configured to have at least two states, a first state and a second state. For example, the switching relay 414-1 may include a transistor, diode, or a collection of electronic components (for example, transistors, resistors, diodes, and/or operational amplifiers) arranged in an electrical network that is configured for operation in at least the first state and the second state. In the first state, the switching relay 414-1 electrically connects the respective motor 430-1 to the bus 406. When the switching relay 414-1 is in the second state, the respective motor 430-1 is not electrically connected to the bus 406.

The switching relay 414-1 has a current interruption rating that is less than the continuous current rating of the motor 430-1. This allows the electronic component or components that are used in the switching relay 414-1 to be relatively small, inexpensive, and/or thermally efficient. Use of such electronic components allows the protection module 410-1 to be implemented on, for example, a printed circuit board (PCB).

All of the protection modules 410-1 to 410-N function in the same manner, are configured in the same manner, and include identical or similar components. Each protection module 410-1 to 410-N includes a respective motor overload module 412-1 in series with a respective switching relay 414-1 to 414-N that has at least the first and second states. Each of the protection modules 410-1 to 410-N is coupled to the motor driver control system 140 via the control path 409. The control path 409 is a multi-wire control cable that includes a separate cable for each of the protection modules 410-1 to 410-N. Each protection module 410-1 to 410-N provides respective data 408-1 to 408-N.

The state of each switching relay 414-1 to 414-N is independent of the state of any other of the relays. Thus, some of the switching relays 414-1 to 414-N may be in the first state while the other of the switching relays 414-1 to 414-N are in the second state. The motor driver control system 140 generates control signals 404-1 to 404-N to control respective switching relays 414-1 to 414-N. Each control signal 404-1 to 404-N may be, for example, a voltage signal that is sufficient to cause one or more electronic components in the respective switching relay 414-1 to 414-N to change state.

Moreover, like the switching relay 414-1 discussed above, all of the switching relays 414-1 to 414-N have a current interruption rating that is less than the continuous current rating of the respective motor 430-1 to 430-N. Thus, relatively small and/or thermally efficient electronic components may be used in all of the switching relays 414-1 to 414-N. Using such electronic components allows the protection module 410-1 to be smaller than an implementation that is configured to break the driver signal 407. Thus, as compared to an implementation in which the protection modules breaks the driver signal 407, the protection modules 401-1 to 401-N occupy a smaller volume of space. As a result, a greater number of the protection modules 401-1 to 401-N may be placed in the same sized housing, such that more motors may be controlled. Alternatively, a smaller sized housing may be used with the same number of modules 401-1 to 401-N. This reduction in size increases the versatility of the system 400 by allowing the system 400 to be used in areas with limited space.

Like the protection apparatus 110, the protection apparatus 410 may be controlled by the motor driver control system 140 to perform the process 260 and/or 370. In these implementations, the data 408-1 to 408-N is analyzed to determine whether any of the motors 130-1 to 130-N have a maintenance condition. If a maintenance condition exists in any of the motors 130-1 to 130-N, the motor driver control system 140 is used to interrupt the motor driver signal 107 such that none of the motors 130-1 to 130-N receive electrical power.

After the driver signal 107 is interrupted, the testing cycle is initiated and all but one of the switching relays 414-1 to 414-N is placed in or kept in the second state such that only one of the motors 130-1 to 130-N is electrically connected to the bus 406. The one of the motors 130-1 to 130-N that is electrically connected to the bus 406 is referred to as the connected motor. The motor driver command module 144 controls the motor driver system 140 to re-establish the driver signal 107. The driver signal 107 is provided to the bus 406. The data received from the protection module 410 is only from the connected motor. The motor driver command module 144 analyzes the data to determine whether the connected motor has a maintenance condition. The motor driver command module 144 also may determine a measure of wellness for the connected motor based on the data.

To test another one of the motors 130-1 to 130-N, the motor driver command module 144 causes the motor driver control system 140 to interrupt the current to the connected motor. The motor driver command module 144 then controls the switching relay associated with the connected motor to change to the second state such that the connected motor is no longer electrically connected to the bus 406. The motor driver command module 144 then controls another one of the switching relays 414-1 to 414-N to be in the first state and controls all of the other switching relays to be the second state such that a different one of the motors 130-1 to 130-N is electrically connected to the bus 406. The motor driver command module 144 continues in this manner until all of the motors 130-1 to 130-N have been tested for a maintenance condition.

After all of the motors 130-1 to 130-N have been tested and while the motor driver control system 140 is not providing the driver signal 107 to the bus 406, the motor driver control apparatus 144 controls the state of each of the switching relays 414-1 to 414-N by issuing a respective control signal 404-1 to 404-N to each switching relay 412-1 to 412-N. The control signals 404-1 to 404-N cause switching relays that are associated with any identified motor to be in the second state and switching networks that are associated with any motor not identified to be in the first state. Thus, when the motor driver control system 140 provides the motor driver signal 107 to the bus, only motors that do not have a maintenance condition are powered.

FIG. 5 is a block diagram of a system 500 that includes the motor driver control system 140 and a protection apparatus 510. The protection apparatus 510 is an example of an implementation of the protection apparatus 110 (FIG. 1). The protection apparatus 510 includes protection modules 510-1 to 510-N. The protection apparatus 510 and the motor driver control system 140 communicate via a control path 509 (shown with a dash-dot line style). The control path 509 is any type of communication path that allows the protection apparatus 510 and the motor driver control system 110 to exchange information, commands, and/or data. The control path 509 may be a wired connection or a wireless connection, and the information, commands, and data may be digital or analog. The protection apparatus 510 may communicate with the motor driver control system 540 using a communications protocol. A communications protocol uses a series of bits to communicate status to the motor driver control system 140. The protection apparatus 510 and the motor driver control system 140 may leverage microcontrollers or similar devices to facilitate passage of the status. For example, the protection apparatus 410 may include an I/O (such as the I/O 119 of FIG. 1) that includes a microcontroller. In some implementations, the status may be passed from the protection apparatus 510 to the motor driver control system 140 via the I/O on the protection apparatus 510. For example, the status of the protection apparatus 510 and/or the status of the protection modules 510-1 to 510-N may be provided over a physical wire connected between an output terminal on the protection apparatus 510 and the I/O interface 143. The output terminal on the protection apparatus 510, may be, for example, a pin connection or an electrical connection on a terminal block. In the example of FIG. 5, the control path 509 is a multi-wire cable that has at least N electrical cables, with one of the N cables being associated with one of the protection modules 510-1 to 510-N. Each of the N electrical cables is capable of transmitting electrical signals.

Each protection module 510-1 to 510-N is electrically connected to a bus 506 and is associated with a respective one of the motors 130-1 to 130-N. Each protection module 501-1 to 510-N includes the same components in the same configuration and functions in a similar manner. For simplicity, only the protection module 501-1 is discussed in detail. However, the description of the protection module 501-1 applies to the other protection modules in the protection apparatus 510.

The protection module 501-1 includes an overload relay 551-1 that is in series with a contactor 552-1. The overload relay 551-1 is a device that interrupts the current to the motor 130-1 when a threshold relating to a thermal overload in the motor 130-1 is reached. The overload relay 551-1 may be a bi-metallic overload relay. A bi-metallic overload relay includes a trip mechanism formed from two different materials joined together. The two different materials have different thermal expansion characteristics. Each of the materials may be a metal material. When the bi-metallic trip mechanism is heated, it changes shape. Under normal operating conditions, the bi-metallic trip mechanism has a shape that enables current to flow through the relay 551-1. For example, under ordinary operating conditions, the bi-metallic trip mechanism may be a substantially flat strip that is in contact with two electrical contacts that are spatially separated from each other. As the current flowing in the bi-metallic trip mechanism increases, the mechanism is heated. At a threshold temperature that depends on the thermal characteristics of the two materials, the shape of the bi-metallic trip mechanism changes such that the mechanism no longer contacts both of the electrical contacts and current does not flow in the relay 551-1. For example, the bi-metallic trip mechanism may bend when a current that is near the rated current of the motor 130-1 flows in the mechanism.

The overload relay 551-1 may have other forms. For example, the overload relay 551-1 may be an electronic overload relay that includes a normally open or normally closed switch, a current sensor, an electronic storage, and an electronic processor. The current sensor measures the current flowing through the relay 551-1. The measured current is compared to threshold currents (or trip curves) stored on the electronic storage. The relay 551-1 actuates the switch to interrupt the current to the motor 130-1 when the measured current exceeds the threshold current. Furthermore, information about the measured current may be provided to the motor driver control system 140 as data 508-1.

The contactor 552-1 is any type of device that is capable of repeatedly establishing and interrupting the current to the motor 130-1. The contactor 552-1 has at least a first state and a second state. When the contactor 553-1 is in the first state, current flows through the contactor 552-1. When the contactor 553-1 is in the second state, current does not flow through the contactor 552-1. The contactor 552-1 includes a switch element 553-1 that is controlled by the motor driver control system 140. The switch element 553-1 determines the state of the contactor 552-1.

In some implementations, the contactor 552-1 may be an electromechanical switch that includes a moveable arm or bar made of an electrically conductive material and two electrically conductive contacts. In these implementations, the switch element 553-1 is the movable bar or arm. The position of the arm or bar is controllable such that the arm or bar may be placed in a first position and a second position. For example, the arm or bar may be connected to a driving rod or coil that controls the position of the arm or bar. In the first position of the arm or bar, the contactor 552-1 electrically connects the two electrical contacts such that that current may flow to the motor 130-1. In the second position, the contactor 552-1 is not in electrical contact with both electrical contacts and current is unable to flow to the motor 130-1. The contactor 552-1 has a current interruption rating that is greater than or equal to the continuous current rating of the motor 130-1. Thus, the contactor 552-1 may be used to interrupt the current to the motor 130-1.

The switching element 553-1 is controlled by the motor driver control system 140. For example, the motor driver control system 140 generates a control signal 504-1 and provides the control signal 504-1 to the protection apparatus 510. The control signal 504-1 is sufficient to cause actuation of the switch element 553-1. For example, the control signal 504-1 may be a voltage signal that is sufficient to drive a coil or other element that moves an arm or bar to change the state of the contactor 552-1.

The other protection apparatus 510-2 to 510-N are the same as the protection apparatus 552-1. In the example shown in FIG. 5, each protection apparatus 510-1 to 510-N produces respective data 508-1 to 508-N. The data 508-1 to 508-N is collectively referred to as the data 508. In other implementations, the system 500 includes a sensor that is separate from the protection apparatus 510 and measures the current that flows from the motor driver control system 140 to the bus 506. In these implementations, the data includes data related to any motor that is electrically connected to the bus 506.

Like the protection apparatus 110, the protection apparatus 510 may be controlled by the motor driver control system 140 to perform the process 260 (FIG. 2) and/or 370 (FIG. 3).

In these implementations, data 508 is analyzed to determine whether any of the motors 130-1 to 130-N have a maintenance condition.

If a maintenance condition exists in any of the motors 130-1 to 130-N, the motor driver command module 144 causes the contactors 552-1 to 552-N to interrupt the current to all the motors 130-1 to 130-N. For example, the motor driver command module 144 may issue control signals 504-1 to 504-N, each of which is sufficient to act on the switching elements 553-1 to 553-N to thereby cause the contactors 552-1 to 552-N to transition to or remain in the second state. When all of the contactors 552-1 to 552-N are in the second state, none of the motors 130-1 to 130-N are powered.

The testing cycle discussed with respect to the process 370 (FIG. 3) is initiated and all but one of the contactors 552-1 to 552-N is placed in or kept in the second state such that only one of the motors 130-1 to 130-N is electrically connected to the bus 506. The one of the motors 130-1 to 130-N that is electrically connected to the bus 506 is referred to as the connected motor. The driver signal 107 is delivered only to the connected motor. The data 508 is only from the connected motor. The motor driver command module 144 analyzes the data to determine whether the connected motor has a maintenance condition. The motor driver command module 144 also may determine a measure of wellness for the connected motor based on the data.

To test another one of the motors 130-1 to 130-N, the motor driver command module 144 changes the state of the contactor associated with the connected motor. The motor driver command module 144 then controls another one of the contactors 552-1 to 552-N to be in the first state and places all of the other contactors 552-1 to 552-N in the second state such that a different one of the motors 130-1 to 130-N is electrically connected to the bus 506.

The motor driver command module 144 continues in this manner until all of the motors 130-1 to 130-N have been tested for a maintenance condition. After all of the motors 130-1 to 130-N have been tested, contactors associated with any motor identified as having a maintenance condition are placed in the second state and switching relays associated with any motor identified as not having a maintenance condition are placed in the first state. Thus, the motor driver control system 140 provides the motor driver signal 107 only to motors that do not have a maintenance condition.

The implementations discussed above and other implementations are within the scope of the claims.

What is claimed is:

1. A motor driver control system configured for connection to a plurality of motors, the motor driver control system comprising a motor driver command module, the motor driver command module configured to:

access information related to one or more operating metrics of the plurality of motors;

analyze the information to determine whether a maintenance condition exists in any of the plurality of motors; and if a maintenance condition exists in any of the plurality of motors:

prevent electrical power from reaching any of the plurality of motors, identify which one or more of the plurality of motors has the maintenance condition, disconnect the one or more identified motors from the motor driver control system, and restore electrical power to all of the plurality of motors other than the identified motors after disconnecting the one or more identified motors.

2. The motor driver control system of claim 1, wherein the maintenance condition comprises a failure condition, the failure condition comprising an overvoltage, an overcurrent, a short circuit, a thermal overload, and/or a loss of a phase.

3. The motor driver control system of claim 1, wherein the information related to the one or more operating metrics comprises the average or peak current collectively drawn by the plurality of motors, a phase of current drawn collectively by the plurality of motors, a voltage applied to the plurality of motors, a waveform that represents current collectively drawn by the plurality of motors over a period of time, and/or a waveform that represents voltage applied to the plurality of motors over a period of time.

4. The motor driver control system of claim 3, wherein the motor driver command module being configured to analyze the information related to the one or more operating metrics comprises the motor driver command module being configured to compare the information to a specification, and a maintenance condition is determined to exist when the information does not meet the specification.

5. The motor driver control system of claim 4, wherein the specification is a range of values, and the information does not meet the specification when the information comprises a value that is not within the range of values.

6. The motor driver control system of claim 5, wherein
the specification is a single value,
the information does not meet the specification when the information comprises a value that is greater than or less than the single value, and
the information meets the specification when the information comprises a value that is equal to the single value.

7. The motor driver control system of claim 1, wherein the motor driver command module being configured to identify which one or more of the plurality of motors has a maintenance condition comprises the motor driver command module being configured to:
provide electrical power to only one of the plurality of motors at any given time during a testing cycle time period to produce test information related to the one or more operating metrics for the one of the plurality of motors,
determine whether the maintenance condition exists in the one of the motors based on the test information, and
if the maintenance condition exists, identify the one of the motors as a motor with a maintenance condition.

8. The motor driver control system of claim 1, further comprising a plurality of protection modules, wherein each of the plurality of protection modules is connected to a particular one of the plurality of motors, and wherein each protection module comprises a motor overload device and a switching relay, and the switching relay has a current interruption rating that is lower than a continuous current rating of the particular one of the plurality of motors, and wherein
the motor driver command module being configured to prevent electrical power from reaching any of the plurality of motors comprises the motor driver command module being configured to break a current supply to the plurality of motors in response to determining that the maintenance condition exists in any of the plurality of motors,
the motor driver command module is further configured to control a state of the switching relay,
the motor driver command module being configured to disconnect the one or more identified motors comprises the motor driver command module being configured to change a state of the switching relay in each protection module that is connected to one of the one or more identified motors.

9. The motor driver control system of claim 8, wherein the motor overload device comprises a motor overload relay.

10. The motor driver control system of claim 8, wherein the motor overload relay comprises a normally open relay and a normally closed relay.

11. The motor driver control system of claim 8, wherein the motor overload relay comprises an electronic overload relay.

12. The motor driver control system of claim 11, wherein
each of the plurality of motors comprises an element configured to spin, and
the motor driver command module is configured to restore electrical power after disconnecting the one or more identified motors and only after any motor not identified as having the maintenance condition is not spinning.

13. The motor driver control system of claim 1, further comprising a plurality of protection modules, wherein each of the plurality of protection modules is connected to a particular one of the plurality of motors, and wherein each protection module comprises an overload relay and contactor that has a current interruption rating equal to or greater than a continuous current rating of the particular one of the plurality of motors, and wherein
the motor driver command module is further configured to control a state of the contactor, and
the motor drive control module being configured to disconnect the one or more identified motors comprises the motor driver command module being configured to change a state of the contactor in each protection module that is connected to one of the one or more identified motors.

14. The motor driver control system of claim 1, wherein the motor driver command module is further configured to analyze the information to determine a measure of wellness for the plurality of motors, the measure of wellness being an indication of an amount of time or an amount of use remaining prior to a maintenance condition occurring.

15. The motor driver control system of claim 14, wherein the motor driver command module is further configured to determine the measure of wellness for each of the plurality of motors.

16. The motor driver control system of claim 1, wherein
each of the plurality of motors comprises an element configured to spin, and
the motor driver command module is further configured to estimate a speed at which the element of at least one motor not identified as having the maintenance condition is spinning.

17. The motor driver control system of claim 16, wherein the motor driver command module is configured to restore electrical power after disconnecting the one or more identified motors and while at least one motor not identified as having the maintenance condition is spinning, and the motor driver command module is further configured to generate a driver signal that, when applied to the at least one motor not identified as having the maintenance condition, the at least one motor not identified as having the maintenance condition continues to operate at the estimated speed.

18. The motor driver control system of claim 1, further comprising:

a plurality of protection modules, wherein each of the plurality of protection modules is electrically connected to a particular one of the plurality of motors, and wherein each protection module comprises an overload relay and contactor that has a current interruption rating equal to or greater than a continuous current rating of the particular one of the plurality of motors.

19. A method of protecting a plurality of motors connected to a motor driver control system, the method comprising:
  allowing electrical power to reach all of the plurality of motors, the electrical power being sufficient to cause the plurality of motors to operate;
  receiving information related to one or more operating metrics of the plurality of motors;
  analyzing the received information to determine whether one or more of the plurality of motors has a maintenance condition;
  if at least one of the plurality of motors has a maintenance condition:
    preventing the electrical power from reaching any of the plurality of motors such that none of the motors operate,
    identifying which one or more of the plurality of motors has the maintenance condition,
    disconnecting the one or more identified motors from the motor driver control system, and
    allowing electrical power to flow to the plurality of motors other than the one or more identified motors after disconnecting the one or more identified motors.

20. The method of claim 19, wherein identifying which one or more of the plurality of motors has the maintenance condition comprises testing each motor separately in a testing cycle, wherein the testing for each motor comprises:
  providing electrical power to one of the plurality of motors at a given time during the testing cycle to produce test information related to the one or more operating metrics of the one of the plurality of motors; and
  analyzing the test information to determine whether the one of the plurality of motors has the maintenance condition.

21. A motor driver command module configured to:
  access information related to one or more operating metrics of a plurality of motors;
  analyze the information to determine whether a maintenance condition exists in any of the plurality of motors; and
  if a maintenance condition exists in any of the plurality of motors:
    prevent electrical power from reaching any of the plurality of motors,
    identify which one or more of the plurality of motors has the maintenance condition,
    disconnect the one or more identified motors from a motor driver control system, and
    restore electrical power to all of the plurality of motors other than the identified motors after disconnecting the one or more identified motors.

* * * * *